US008237735B2

(12) United States Patent
Yao et al.

(10) Patent No.: US 8,237,735 B2
(45) Date of Patent: Aug. 7, 2012

(54) CACHING FOR COLOR MANAGEMENT SYSTEMS PERFORMING A GAMUT MAPPING FUNCTION

(75) Inventors: Meng Yao, West Linn, OR (US); James W. Reid, Brockport, NY (US)

(73) Assignee: Xerox Corporation, Norwalk, CT (US)

( * ) Notice: Subject to any disclaimer, the term of this patent is extended or adjusted under 35 U.S.C. 154(b) by 1015 days.

(21) Appl. No.: 12/017,551

(22) Filed: Jan. 22, 2008

(65) Prior Publication Data

US 2009/0184975 A1 Jul. 23, 2009

(51) Int. Cl.
   G09G 5/02 (2006.01)
   G06K 1/00 (2006.01)
   G06K 15/00 (2006.01)
(52) U.S. Cl. .................. 345/590; 358/1.9; 358/2.1
(58) Field of Classification Search .................. 345/590; 358/1.9, 2.1
   See application file for complete search history.

(56) References Cited

U.S. PATENT DOCUMENTS

| 6,250,733 | B1 | 6/2001 | Yao et al. | |
|---|---|---|---|---|
| 7,573,620 | B2 * | 8/2009 | Presley et al. | 358/518 |
| 2007/0058181 | A1 * | 3/2007 | Hatori | 358/1.9 |
| 2007/0177175 | A1 * | 8/2007 | Matsuoka | 358/1.9 |
| 2007/0236506 | A1 * | 10/2007 | Tin | 345/590 |
| 2009/0284554 | A1 * | 11/2009 | Doser | 345/690 |

* cited by examiner

Primary Examiner — Jeffrey Chow
(74) Attorney, Agent, or Firm — Philip E. Blair; Fleit Gibbons Gutman Bongini & Bianco P.L.

(57) ABSTRACT

What is provided herein is a novel system and method which improves efficiency of a color management system performing a gamut mapping function. In one embodiment, a plurality of source colors are examined to determine whether any have changed. If not, then the source profile, the source device model, and the color appearance model have not changed. Next, the primary colors of the destination device are examined to determine whether any of these have changes. If these have not changed, then the destination device profile and the destination device model have not changed. When the source profile, device profile, color appearance model and the device models have not changed, gamut mapping does not have to be performed. The cached gamut mapping data are used instead. The gamut mapping data are used in subsequent mappings between these same two devices. The cached gamut mapping data are used to customize a color response of the destination device.

9 Claims, 3 Drawing Sheets

CACHING FOR COLOR MANAGEMENT SYSTEMS PERFORMING A GAMUT MAPPING FUNCTION

TECHNICAL FIELD

The present invention is directed to systems and methods for improving performance of color management systems performing a gamut mapping function between color devices.

BACKGROUND

Color display and printing have improved in recent years to the point where photo-realistic color images and complex color graphics are now commonly used not only in desktop publishing, but also across a broad spectrum of data and presentation applications. The increased use of color content in all forms of digital communication necessitates the implementation of a color management scheme for differing operating systems, such as the Windows® operating systems by the Microsoft Corporation. The color management scheme that is used by Windows 98, Windows 2000, Windows XP, and other operating systems from Microsoft® is called Image Color Management (ICM) 2.0. The color management scheme that is used by Microsoft Vista operating system is called the Microsoft Windows Color System (WCS). The Microsoft Windows Color System color management scheme is a superset of Image Color Management 2.0 APIs and functionality.

The Microsoft Windows Color System is a platform for color management exclusive to Windows Vista that strives to achieve color consistency across various software and hardware, including cameras, monitors, printers and scanners. Different devices interpret the same colors differently, according to their software and hardware configurations. As a result, they must be properly calibrated to reproduce colors consistently across different devices. WCS makes this process of color calibration automatic and transparent, as an evolution of International Color Consortium (ICC) Color Profiles.

The Microsoft Windows Color System (WCS) technology ensures that a color image, graphic or text object is rendered as close as possible to its original intent on any device, despite differences in imaging technologies and color capabilities between devices. The colors must remain consistent and accurate whether one is scanning an image or other graphic on a color scanner, downloading over the Internet, viewing or editing on a screen, or outputting to paper, film, or other media. WCS has some modules that are replaceable by plug-ins, for example the gamut map model and the device model.

The color processing pipeline allows device developers to add their own gamut mapping algorithm into the pipeline to customize the color response of the device. Using the color profiles, the Color Infrastructure and Translation Engine (CITE) and the plug-in extensions, a color transform is created. The CITE then applies the color transform to input image content to create output content appropriate for the output device.

Obtaining predictable color reproduction in the digital darkroom can be a challenge because each device—digital camera, scanner, monitor, or printer—responds to or produces color differently. If one limits operations to well-characterized equipment and follows the procedures outlined in monitor calibration and printer calibration, reasonably good results can be obtained without color management. The operating system performs a certain amount covertly, in the background. It may also be desirable to improve the color match between a monitor and printer. To meet these goals one needs to get involved with the set of software packages and procedures known as color management and profiles.

Profiles consist primarily of tables that relate numeric data, for example, RGB (222, 34, 12), to colors expressed in a device-independent CIE color space called a Profile Connection Space (PCS)—either CIE-XYZ or CIELAB. CIE stands for the International Commission on Illumination (CIE for its French name Commission Internationale de l'Eclairage) which is a recognized international authority on light, illumination, color, and color spaces. The colors may be the objects sensed by a scanner or produced by a printer or monitor. They can also refer to one of the numerous color spaces. Monitor profiles have the same format as color space profiles. Profiles may contain additional data, such as a preferred rendering intent and gamma. Monitor profiles often contain instructions for loading video card lookup tables, i.e., for calibrating the monitor.

The heart of color management is often the translation or gamut mapping between devices with different color gamuts and files with different color spaces. Mapping functions are typically performed by a Color Matching Module (CMM), also called a Color Engine, using data in the profiles. One application such as Picture Window Pro, for example, uses either the Windows default color engine, ICM 2.0, or an alternative engine, LittleCMS. Adobe Photoshop has its own color engine, known as ACE. Color engine mappings may be called from ICM-aware programs or device drivers. One must be aware of where the color translation takes place in a particular environment. In some instances, mapping can take place twice (or not at all) producing undesirable results. The CMM combines the input and output profiles to perform a direct conversion between the devices or color spaces. It interpolates data in printer profile tables which would be prohibitively large if all possible color values were included.

Gamut mapping is usually performed with one of the four rendering intents (gamut mapping algorithms) recognized by the International Color Consortium (ICC) standard. The gamut mapping algorithm determines how colors are handled that are present in the source device but out of gamut in the destination device. Since different devices don't have the same gamut, they need some rearrangement. This may be particularly the case near the borders of the gamut. Some colors need to be shifted to the inside of the gamut as they otherwise cannot be represented on the output device and would simply be clipped. For instance, to print a mostly saturated blue from a monitor to paper with a typical CMYK printer, will likely produce undesirable results because the paper blue may not be that saturated. Conversely, the bright cyan of an inkjet printer may not be easily represented on a monitor. The color management system often utilizes various methods to achieve desirable results. Some systems give users control of the gamut mapping behavior.

Color management systems use increasingly sophisticated algorithms for color mapping. However, as these algorithms get more complicated, processing time tends to increase accordingly. Increased processing time can degrade overall performance where speed is important.

Accordingly, what is needed in this art are increasingly sophisticated applications and advanced methodologies for color management systems which improve performance while increasing efficiency in the color transformation process.

BRIEF SUMMARY

What is provided herein are a novel system, computer program product, and method which improves efficiency in a color management system performing a gamut mapping function between color devices. One such color management system is the Microsoft Windows Color System application for the Windows Vista operating system offered by the Microsoft Corporation. It should be understood that one or more of the embodiments described herein will find their uses in other color management applications in other operating systems and devices.

In one example embodiment, the method comprises first determining whether any gamut mapping data associated with a source device and a destination device already exists in cache. The cached gamut mapping data comprises, in one embodiment, any one or more of a size of a color transform LUT, a gamut shell of the source device, a gamut shell of the destination device, and an array of output colors, i.e., the gamut mapping output. Other information related to the color transformation between the source and destination devices can also be cached. If the gamut mapping data for the color transformation between the source device and the destination device already exists in cache then the cached gamut mapping data is retrieved. All the components in the gamut mapping data, except the array of output colors, are used to determine whether a new gamut mapping needs to be performed, or whether the cached gamut mapping output from a previous gamut mapping, i.e., the cached array of output colors, can be used without performing gamut mapping for the current color configuration between this source and destination device. When the gamut map model is called by the color management process, the values of the components, except the array of output colors, in the cached gamut mapping data, if such cached gamut mapping data exists, are compared against the values of the same components that are passed to the gamut map model for the current color configuration. If none of the components have changed values, which indicates that the source profile, the destination profile, the device models, the color appearance models and the size of the color transform LUT have not changed, the cached gamut mapping data can be used for the current color configuration. If any of the values of any such components of the gamut mapping data have changed, a new gamut mapping needs to be performed for the current color configuration. Gamut mapping the color space of the source device to the color space of the destination device produces new gamut mapping data. The new gamut mapping data, which, in one embodiment, includes the new array of output colors generated as a result of gamut mapping, is cached. In another embodiment, updated values of other components of the color transformation between this source and destination device are also cached. In subsequent color transformations between this same source and destination device, the cached gamut mapping data and other cached components are retrieved and used if nothing has changed which would affect the color transformation between the source and destination device. A color response of the destination device can be customized based on the cached gamut mapping data. In one embodiment, customizing the color response involves using the gamut mapping data in a color transformation process to produce a desired color output on the destination device.

The subject matter disclosed herein will next be described in connection with certain illustrated embodiments. It should be understood that various changes and modifications can be made by those skilled in the art without departing from the spirit or scope of the invention.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided herein are a novel system, computer program product, and method which improves efficiency in a color management system performing a gamut mapping function between color devices.

It should be understood that one of ordinary skill in this art would be readily familiar with color space, color imaging, color transformation, gamut mapping, and other techniques commonly found in the art of color management. One of ordinary skill in this art would also be readily familiar with systems, software, and programming sufficient to implement the following functionality and capabilities as described in detail herein in their own system environments without undue experimentation.

Figure 1:
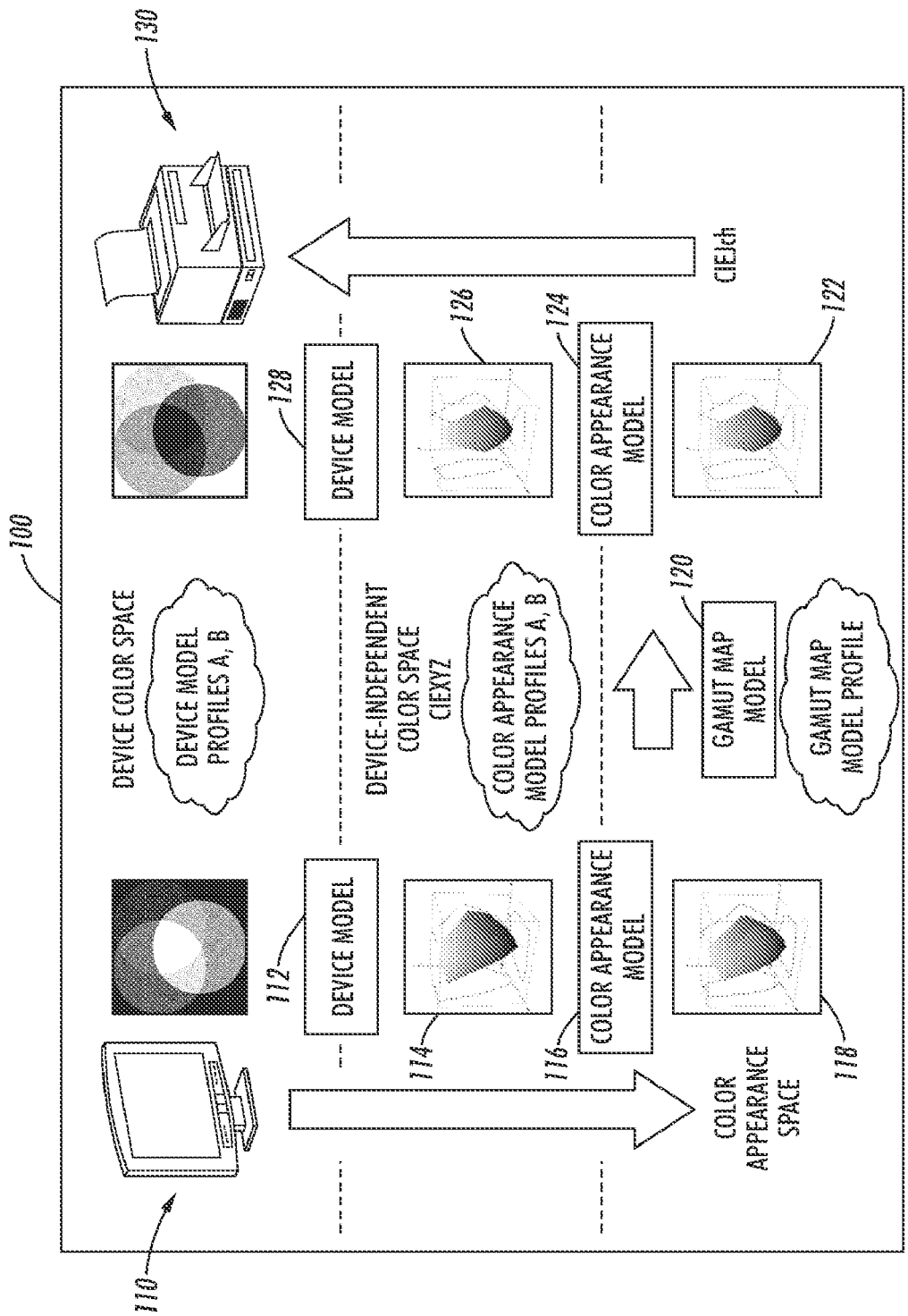
FIG. 1 illustrates an example of a Microsoft Windows Color System (WCS) pipeline wherein the left side reflects different stages of the source device in the WCS pipeline, and the right side reflects different stages of the destination (printer) device.

FIG. 1 illustrates the Microsoft Windows Color System (WCS) pipeline 100 wherein the left side reflects different stages of the source device in the WCS pipeline, and the right side reflects different stages of the destination (printer) device.

The pipeline 100 starts with the source device 110, which is represented by a device model 112. The source device model provides the conversion from device space colors to CIEXYZ colors for the source device. The source device model also calculates the gamut shell of the source device in CIEXYZ space 114. The source gamut shell is converted from CIEXYZ space to the gamut shell of the destination device in CIEJCh space 118 using the color appearance model 116.

On the right side of the pipeline of FIG. 1, the gamut shell in CIEJCh space for the printer is calculated by the printer device model. With both the source and printer gamut shells available in CIEJCh space, gamut mapping from the source device to the printer is performed by gamut map model 120. The gamut mapped colors are then converted from CIEJCh space 122 to CIEXYZ space 126 using color appearance model 124.

At the final stage, the device model 128 for the printer converts the CIEXYZ colors to the colors of printer device 130. A color transform LUT is built using this pipeline that converts source colors to printer colors. This color transform can be applied, for example, to each pixel in a source image.

The color appearance model used in the Microsoft Windows Color System (WCS) is the CIECAM02. This model is generally not replaceable in the pipeline. The device model and the gamut map model can be replaced by WCS plug-ins. WCS plug-ins can be used by application vendors or printer vendors to implement proprietary gamut map algorithms or device model algorithms. As algorithms get more complicated, processing slows down. One way to improve the performance is to cache results in the WCS pipeline. For example, if the source and printer WCS profiles have not changed (WCS profiles are counterparts of ICC profiles in WCS), and if the source and printer device models, gamut map models as well as parameters of the color appearance model, have not changed, and the requested color transform lookup table (LUT) size has not changed, then the color transform (LUT) from source space to printer space remains the same, and does not need to be recalculated.

Through experimentation, it has been determined that in PhotoGallery, (the default application that handles RGB images in Microsoft Vista), apparently does not retain the color transform which is built at the end of the WCS pipeline, when using WCS. At least this is the case when plug-ins are used. Once a print job is finished, the color transform is no longer kept in memory.

Determining whether the printer device profile has changed is non-trivial. This involves parsing the profile, storing all the measurements in an array and comparing the data against cached measurement data from a previous profile. This may not be an elegant solution because by the time all this checking has been done, it could have constructed the gamut map model and the device model. Given the complexity of caching the color transform lookup table (LUT), the plug-ins are a better place to cache the intermediate results in the WCS pipeline. As such, the gamut map model plug-in is a better place to perform the caching.

As shown in FIG. 1, the module in the Microsoft Windows Color System pipeline that performs the color conversion from one device to another device is essentially the gamut map model. The device model and color appearance model serve the purpose of pre-converting the device data to a common objective color space (Jab in the case of WCS) and feed the data to the gamut map model so that it can perform the color conversion from one device to another.

As described herein, the gamut mapping data results are cached only when several conditions are met, for example, the device profiles not having changed; the color appearance parameters not having changed; the device models not having changed and the size of the lookup table not having changed.

The process can be cascaded, i.e., there can be multiple devices involved in the pipeline with multiple gamut mappings, for example, device A is mapped device B first, and then device B is mapped to device C, etc.

As already explained above, the gamut map model is responsible for mapping source JCh values into JCh values for the destination device. In the gamut map model plug-in, an array of source colors in the JCh space is passed to the computer program module SourceToDestinationAppearanceColors in the WCS. These colors correspond to the input colors of the color transform LUT. Proprietary algorithms can be used in the module SourceToDestinationAppearanceColors to perform gamut mapping between the source device and the destination device. The output of the algorithm is an array of colors in JCh space for the destination device. Several things are known to the module SourceToDestinationAppearanceColors: the size of the LUT, the input array of JCh colors, the source gamut shell and the destination gamut shell.

Alternatively, a static variable initialized to 0 can be used to indicate whether the method has been visited before. In this embodiment, when the static variable is, for example, equal to 0, this is the first time we have visited the method. No prior results have been cached. As such, gamut mapping needs to be performed to generate the output array of JCh colors. The input and output arrays of JCh colors and their size are cached. The JCh values of the primary colors (C, M, Y, K, R, G, B) of the destination device are also cached. At the same time, the static variable is set to 1. When visiting the method with the value of the static variable set to 1, this method has been visited before. As such, the size of the input color array is first examined. If it is different than the cached value, a color transform that is a different size is to be constructed. Therefore, gamut mapping needs to be performed again.

If it is determined that the size of the input color array is not different (has not changed) then the input color array is checked against the cached input color array. If it is subsequently determined that these two input color arrays are different, i.e., these contain different colors, then gamut mapping must be performed again. If these two color arrays contain identical colors, then it can be determined that the source profile, source device model, and the color appearance parameters, have not changed. These have not changed because changes to any of these will result in an input color array that is different than the cached input array.

Since the destination device gamut shell is known, the primary colors can be extracted from the gamut shell and their JCh values obtained. These color values are then compared against the cached primary color values. If it is determined that the destination device profile, the device model, or the parameters of the color appearance model have changed, then it can be determined that the primary colors have changed. Conversely, if the primary colors are the same as the cached primary colors, it can be determined that any module related to the destination device has not changed. This is understood because the seven primary colors for the printer are measured data, and it is very rare that two different printers have the same measurements. One skilled in this art would understand that, even on the same printer, it is highly unlikely that two sets of measurements will be exactly the same. As such, when the input array size, the input array of colors, and the primary colors of the destination device have not changed, there is no need to perform gamut mapping again. The cached output array of colors can be used.

Instead of caching the input array, alternatively only the primary colors (C, M, Y, K, R, G, B) of the source gamut shell are cached. The source primary colors are used to determine whether any module related to the source device has changed. Instead of caching 4913 input colors for example a 17×17×17 table, only the 7 primary colors of the input gamut shell need to be cached. In that case, what is subsequently cached is the array size, the 7 primary colors of the source gamut, the 7 primary colors of the destination gamut, and the output array of colors. The first three cached items are used to determine whether gamut mapping needs to be subsequently performed or whether the cached output array of colors can be utilized instead.

Figure 2:
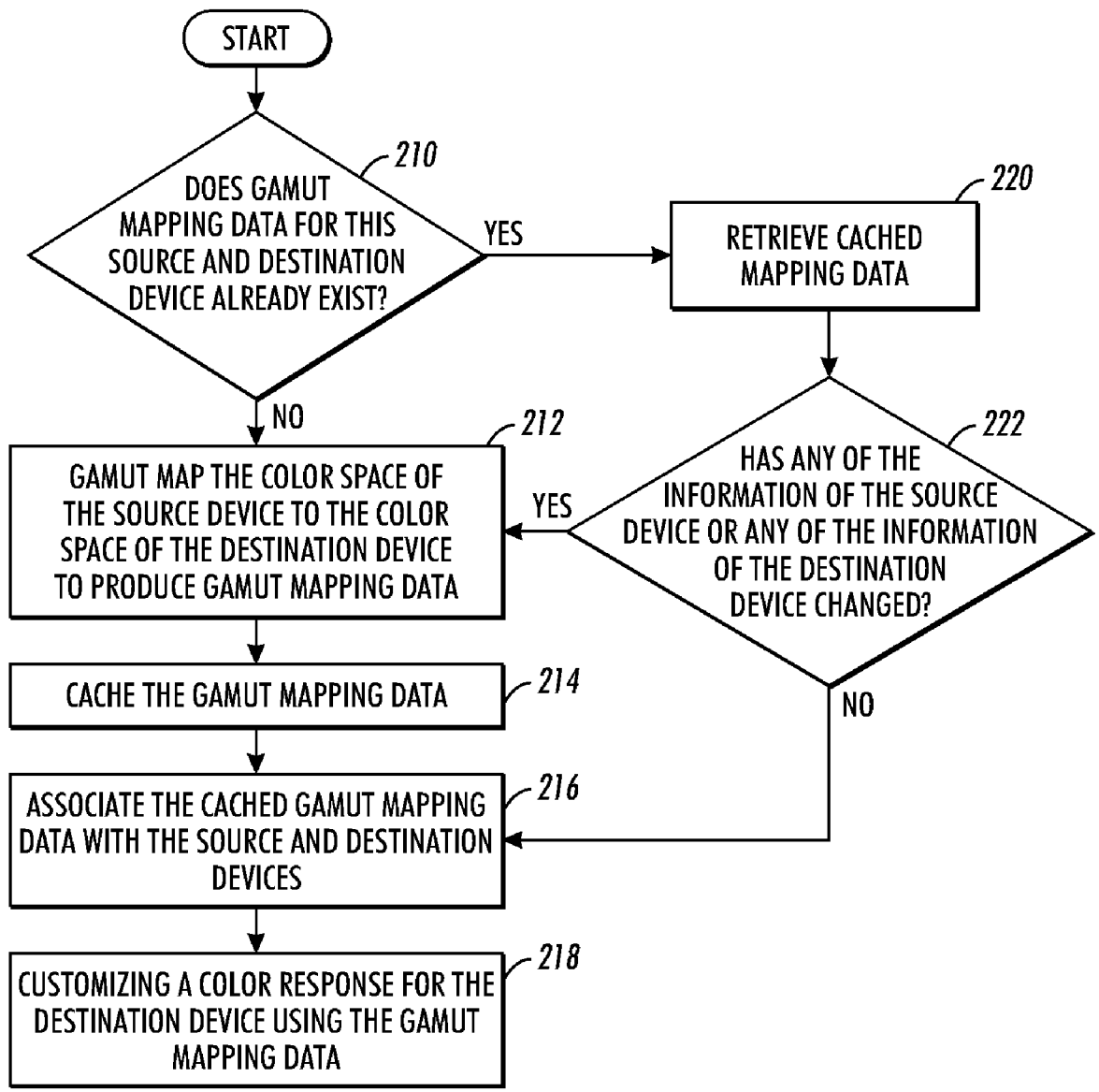
FIG. 2 is a flow diagram illustrating one embodiment of the present method for increasing performance of a gamut mapping function in a color management system.

Reference is now being made to the flow diagram of FIG. 2 illustrating one embodiment of the present method for increasing performance of a gamut mapping function in a color management system.

At step 210, a determination is made whether gamut mapping data associated with the source device and the destination device already exists in cache. In response to the gamut mapping data not existing in cache, at step 212, the color space associated with the source device is gamut mapped to the color space associated with the destination device. This produces new gamut mapping data. At step 214, the new gamut mapping data is cached. The cached gamut mapping data comprises, in one embodiment, any one or more of a size of a color transform LUT, a gamut shell of the source device, a gamut shell of the destination device, and an array of output colors, i.e., the gamut mapping output. Other information and mapping components related to the color transformation between the source and destination devices can also be cached.

At step 216, the new gamut mapping data is associated with the source device and the destination device. This association is necessary to identify and retrieve the gamut mapping data from cache in subsequent color transformations between this same source and destination device. At step 218, a color response of the destination device is customized based on the new gamut mapping data. In one embodiment, customizing the color response involves using the gamut mapping data and other cached components in a color transformation process to produce a desired color output on the destination device.

If, at step 210, the gamut mapping data for the color transformation between the source device and the destination device already exists in cache, then, at step 220, the cached gamut mapping data is retrieved. At step 222, a determination is made whether any information of the source device or any information of the destination device has changed which would result in a change in any of the components of the gamut mapping data. For example, changes in profiles, device models, or color appearance parameters will result in changes in the components of the gamut mapping data. All the components in the gamut mapping data, except the array of output colors, are used to determine whether gamut mapping needs to be performed, or the cached gamut mapping output from a previous gamut mapping can be used for the color transformation between this source and destination device. When the gamut map model is called by the color management process, the values of the components, except the array of output colors, in the cached gamut mapping data, if such cached gamut mapping data exists, are compared against the values of the same components that are passed to the gamut map model for the current color configuration. If anything has changed that would result in a change in gamut mapping data, at step 212, the color space associated with the source device is then gamut mapped to the color space associated with the destination device. This produces new gamut mapping data. At step 214, the new gamut mapping data is cached. At step 216, the cached new gamut mapping data is then associated with the source device and the destination device. At step 218, the new gamut mapping data is used to customize a color response for the destination device. In one embodiment, customizing the color response involves using the gamut mapping data and other cached components in a color transformation process to produce a desired color output on the destination device.

In another embodiment, the gamut mapping data is constructed in response to any of a device profile or a color appearance model of the source device having changed.

In another embodiment, the gamut mapping data is constructed in response to a device profile or a color appearance model of the destination device, or any primary colors of the destination device having changed.

The embodiments discussed above will find their uses in a plug-in for a color management system. A plug-in is a computer program that interacts with a host application, such as a color management system, to add a specific function or capability thereto. Applications support plug-ins for many reasons such as: enabling third party developers to create capabilities to extend an application's functionality, reducing the size of an application, and separating source code from an application for portability. One skilled in the art of computer programming, specifically as it relates to plug-ins for a color management system, would readily be able to implement the various embodiments hereof without undue experimentation. Such an implementation would depend on the operating system upon which the specific color management system operates. Therefore, a specific discussion as to computer program code for such a plug-in is omitted.

It should also be understood that the flow diagrams depicted herein are illustrative. For example, one or more of the operations illustrated in any of the flow diagrams may be performed in a differing order. Other operations, for example, may be added, modified, enhanced, condensed, integrated, or consolidated. Variations thereof are envisioned and are intended to fall within the scope of the appended claims.

Figure 3:
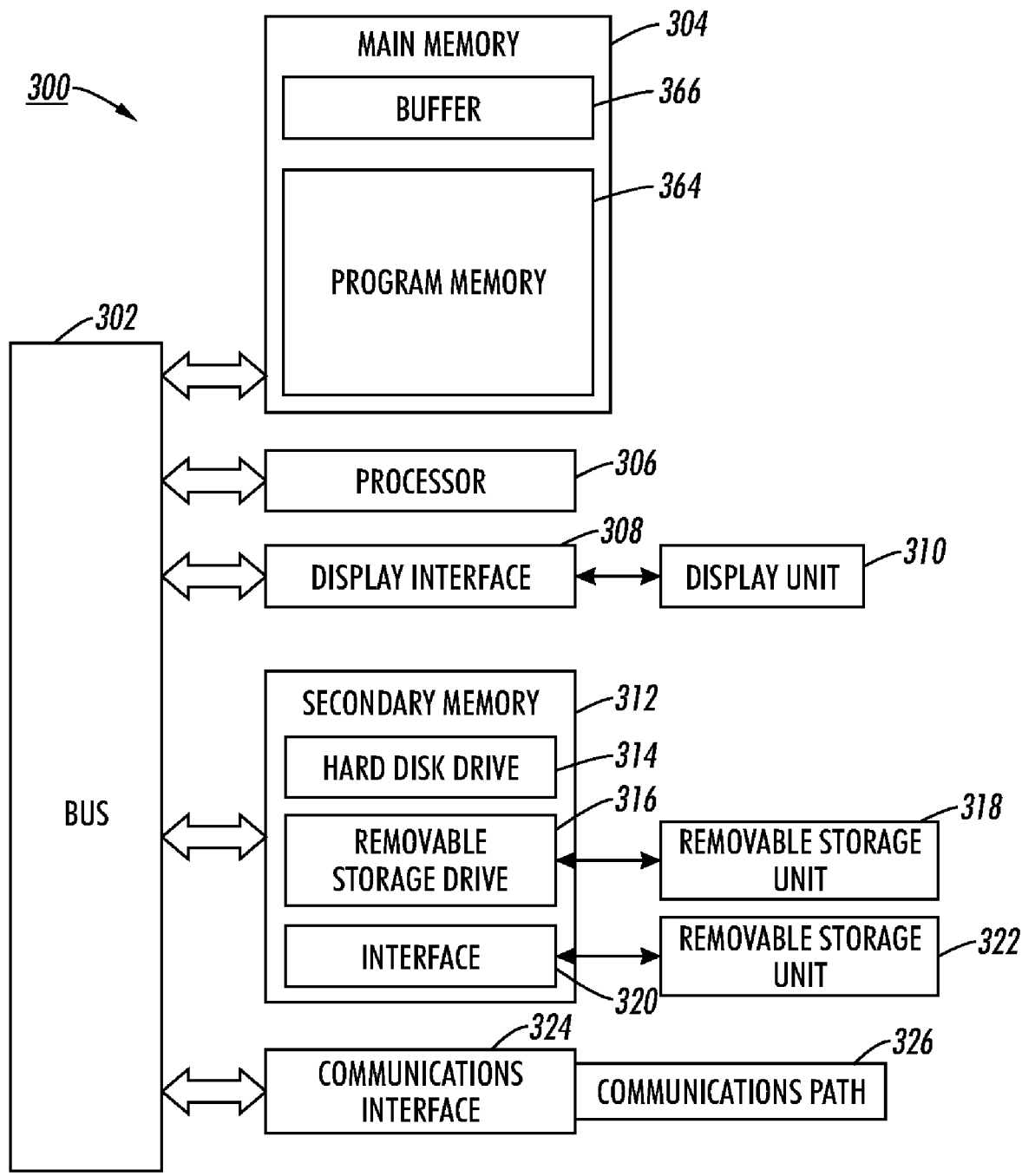
FIG. 3 is a block diagram of a computer system useful for implementing one embodiment of the method illustrated in the flow diagram of FIG. 2.

Reference is now being made to FIG. 3 illustrating a block diagram of a computer system useful for implementing one embodiment of the method illustrated in the flow diagram of FIG. 2.

The computer system 300 can be a xerographic system, a photocopier, or printing device. The computer system includes one or more processors, such as processor 306 capable of executing machine executable program instructions. In the embodiment shown, the processor is in communication with bus 302 (e.g., a backplane interface bus, crossover bar, or data network). The computer system also includes a main memory 304 that is used to store machine readable instructions to be executed by the processor. The main memory is capable of storing data used by or produced by the processor. The main memory may alternatively include random access memory (RAM) to support reprogramming and flexible data storage.

In the embodiment shown, main memory includes buffer 366 to temporarily store data for access by the processor, and a program memory 364 that includes, for example, executable programs that implement the methods described herein. The program memory is capable of storing a subset of the data that is less than all of the data contained in the buffer.

Computer system 300 includes a display interface 308 that forwards data from communication bus 302 (or from a frame buffer not shown) to display 310. The computer system also includes a secondary memory 312. The secondary memory may include, for example, a hard disk drive 314 and/or a removable storage drive 316 which reads and writes to removable storage unit 318, such as a floppy disk, magnetic tape, optical disk, etc., that stores computer software and/or data.

In an alternative embodiment, the secondary memory 312 includes other similar mechanisms for allowing computer programs or other instructions to be loaded into the computer system. Such mechanisms may include, for example, a removable storage unit 322 adapted to exchange data through interface 320. Examples of such mechanisms include a program cartridge and cartridge interface (such as that found in video game devices), a removable memory chip (such as an EPROM, or PROM) and associated socket, and other removable storage units and interfaces 320 which allow software and data to be transferred from the removable storage unit to the computer system.

The computer system 300 includes a communications interface 324 which acts as both an input and an output to allow software and data to be transferred between the computer system and external devices. Examples of a communications interface include a modem, a network interface (such as an Ethernet card), a communications port, a PCMCIA slot and card, etc.

Software and data transferred via the communications interface are in the form of signals which may be, for example, electronic, electromagnetic, optical, or other signals capable of being received by communications interface 324. These signals are provided to communications interface via a communications path (i.e., channel) 326 which carries signals and may be implemented using wire, cable, fiber optic, phone line, cellular link, RF, or other communications channels.

What is claimed is:

1. A method for improving gamut mapping for speed performance in a Microsoft® Windows Color System (WCS) color management pipeline, the method comprising:
in response to a print job having been initiated on a Microsoft® Windows® Operating System having a Windows Color System plug-in:
determining whether a gamut mapping data associated with a source device and a destination device exists in cache, said cached gamut mapping data comprising an array of input colors and an array of output colors; and
in response to said gamut mapping data existing in cache, performing:
determining whether at least one of a size of said array of input colors and a size of said array of output colors of said source device has changed which would result in a change in said cached gamut mapping data;
in response to said at least one of a size of said array of input colors and a size of said array of output colors of said source device having changed, performing:
gamut mapping a source color space associated with said source device to a destination color space associated with said destination device to produce a new gamut mapping data;
caching said new gamut mapping data;
associating said new gamut mapping data with said source device and said destination device; and
customizing a color response of said destination device based on said new gamut mapping data; and
in response to each of said size of said array of input colors and said size of said array of output colors of said source device remaining constant, using said gamut mapping data associated with said source device and said destination device that exists in cache.

2. The method of claim 1, wherein in response said gamut mapping data not existing in cache, further comprising:
gamut mapping said source color space associated with said source device to said destination color space associated with said destination device to produce a new gamut mapping data;
caching said new gamut mapping data;
associating said new gamut mapping data with said source device and said destination device; and
customizing a color response of said destination device based on said new gamut mapping data.

3. The method of claim 1, wherein information of said source device comprises at least one of: an array of source JCh colors, a size of said source JCh color array, a device profile of said source device, a color appearance model of said source device, and any primary colors of a gamut shell of said source device, and wherein information of said destination device comprises at least one of: an array of destination JCh colors, a device profile of said destination device, any primary colors of said destination device, and any primary colors of a gamut shell of said destination device.

4. A system for improving gamut mapping for speed performance in a Microsoft® Windows Color System (WCS) color management pipeline, the system comprising:
a storage medium capable of storing data; and
a processor in communication with said storage medium, said processor capable of executing a machine readable instruction for performing the method of:
in response to a print job having been initiated on a Microsoft® Windows® Operating System having a Windows Color System plug-in:
determining whether a gamut mapping data associated with a source device and a destination device exists in cache, said cached gamut mapping data comprising an array of input colors and an array of output colors; and
in response to said gamut mapping data existing in cache, performing:
determining whether at least one of a size of said array of input colors and a size of said array of output colors of said source device has changed which would result in a change in said cached gamut mapping data;
in response to said at least one of a size of said array of input colors and a size of said array of output colors of said source device having changed, performing:
gamut mapping a source color space associated with said source device to a destination color space associated with said destination device to produce a new gamut mapping data;
caching said new gamut mapping data;
associating said new gamut mapping data with said source device and said destination device; and
customizing a color response of said destination device based on said new gamut mapping data; and
in response to each of said size of said array of input colors and said size of said array of output colors of said source device remaining constant, using said gamut mapping data associated with said source device and said destination device that exists in cache.

5. The system of claim 4, wherein in response said gamut mapping data not existing in cache, further comprising:
gamut mapping said source color space associated with said source device to said destination color space associated with said destination device to produce a new gamut mapping data;
caching said new gamut mapping data;
associating said new gamut mapping data with said source device and said destination device; and
customizing a color response of said destination device based on said new gamut mapping data.

6. The system of claim 4, wherein information of said source device comprises at least one of: an array of source JCh colors, a size of said source JCh color array, a device profile of said source device, a color appearance model of said source device, and any primary colors of a gamut shell of said source device, and wherein information of said destination device comprises at least one of: an array of destination JCh colors, a device profile of said destination device, any primary colors of said destination device, and any primary colors of a gamut shell of said destination device.

7. A computer program product for improving gamut mapping for speed performance in a Microsoft® Windows Color System (WCS) color management pipeline, the computer program product comprising:
a non-transitory computer readable media for storing instructions that, when executed on a computer, cause the computer to perform a method comprising:
in response to a print job having been initiated on a Microsoft® Windows® Operating System having a Windows Color System plug-in:
determining whether a gamut mapping data associated with a source device and a destination device exists in cache, said cached gamut mapping data comprising an array of input colors and an array of output colors; and in response to said gamut mapping data existing in cache, performing:

determining whether at least one of a size of said array of input colors and a size of said array of output colors of said source device has changed which would result in a change in said cached gamut mapping data;

in response to said at least one of a size of said array of input colors and a size of said array of output colors of said source device having changed, performing:

gamut mapping a source color space associated with said source device to a destination color space associated with said destination device to produce a new gamut mapping data;

caching said new gamut mapping data;

associating said new gamut mapping data with said source device and said destination device; and customizing a color response of said destination device based on said new gamut mapping data; and in response to each of said size of said array of input colors and said size of said array of output colors of said source device remaining constant, using said gamut mapping data associated with said source device and said destination device that exists in cache.

8. The computer program product of claim 7, wherein in response said gamut mapping data not existing in cache, further comprising:

gamut mapping said source color space associated with said source device to said destination color space associated with said destination device to produce a new gamut mapping data;

caching said new gamut mapping data;

associating said new gamut mapping data with said source device and said destination device; and customizing a color response of said destination device based on said new gamut mapping data.

9. The computer program product of claim 7, wherein information of said source device comprises at least one of: an array of source JCh colors, a size of said source JCh color array, a device profile of said source device, a color appearance model of said source device, and any primary colors of a gamut shell of said source device, and wherein information of said destination device comprises at least one of: an array of destination JCh colors, a device profile of said destination device, any primary colors of said destination device, and any primary colors of a gamut shell of said destination device.

* * * * *